(12) United States Patent
Hart

(10) Patent No.: US 7,441,397 B2
(45) Date of Patent: Oct. 28, 2008

(54) CABLE/HOSE HAULAGE CHAIN

(75) Inventor: Anthony John Hart, Nottingham (GB)

(73) Assignee: Mansign Mining Equipment Limited, Huthwaite, Nottingham (GB)

( * ) Notice: Subject to any disclaimer, the term of this patent is extended or adjusted under 35 U.S.C. 154(b) by 0 days.

(21) Appl. No.: 10/558,534

(22) PCT Filed: May 27, 2004

(86) PCT No.: PCT/GB2004/002287

§ 371 (c)(1),
(2), (4) Date: Feb. 7, 2007

(87) PCT Pub. No.: WO2004/106773

PCT Pub. Date: Dec. 9, 2004

(65) Prior Publication Data

US 2008/0016842 A1    Jan. 24, 2008

(30) Foreign Application Priority Data

May 30, 2003   (GB) ................................ 0312361.9

(51) Int. Cl.
*F16G 13/16* (2006.01)
(52) U.S. Cl. .............................. 59/78.1; 248/49; 248/51
(58) Field of Classification Search ............. 59/78.1; 248/49, 51
See application file for complete search history.

(56) References Cited

U.S. PATENT DOCUMENTS

| | | | |
|---|---|---|---|
| 3,772,875 A | 11/1973 | Viano | |
| 5,711,144 A * | 1/1998 | Pea | 59/78.1 |
| 6,029,437 A | 2/2000 | Hart | |
| 6,067,788 A | 5/2000 | Weber | |
| 6,789,383 B1 * | 9/2004 | Plush et al. | 59/78.1 |

FOREIGN PATENT DOCUMENTS

| | | |
|---|---|---|
| DE | 9318441 | 2/1994 |
| GB | 1087593 | 10/1967 |
| GB | 1149341 | 4/1969 |
| WO | 0129448 | 4/2001 |

OTHER PUBLICATIONS

International Search Report for corresponding Application No. PCT/GB2004/002287.

* cited by examiner

Primary Examiner—David B Jones
(74) Attorney, Agent, or Firm—Renner, Otto, Boiselle & Sklar, LLP.

(57) ABSTRACT

A chain link for a haulage chain capable of hauling cables and hoses, wherein a housing body has opposed side walls extending between opposed top and bottom walls, first and second chain link transmission members respectively connected to the opposed side walls and each being configured for pivotal connection to respective first and second chain link transmission members of adjacent chain links to define a chain. The top wall and an upper portion of each of the opposed side walls defines a first housing shell and the bottom wall and a lower portion of each of the opposed side walls define a second housing shell, the first and second housing shells being separable from one another. The first and second housing shells are retained together to define the housing, but are separable to permit loading/removal of cables and hoses into/out of the chain link.

4 Claims, 4 Drawing Sheets

CABLE/HOSE HAULAGE CHAIN

The present invention relates to a cable/hose haulage chain, in particular a cable/hose haulage chain suitable for use in a mine.

Haulage chains are used in a mine for holding cables and hoses which extend from a fixed supply point to a mobile machine such as a coal cutting machine which traverses a coal face.

The haulage chain retains the cables and hoses in a disciplined manner and enables the cables and hoses to be pulled behind the machine as it traverses the coal face without imposing excessive tensile forces onto the cables/hoses which might otherwise cause them to undergo undesirable stretching. The haulage chain also serves to protect the cables and hoses from damage due to snagging or rubbing against static surfaces as they follow the machine.

In order to balance the pulling forces on both sides of the chain, it is desirable that opposed sides of individual chain links are pivotally joined to the opposed sides of neighbouring chain links. However, the provision of pivotal connections on each side of adjacent chain links imposes a restriction on the ease of loading and removing cables/hoses into/from the chain.

It is a general aim of the present invention to provide a haulage chain composed of chain links having opposed sides pivotally joined to the opposed sides of neighbouring chain links and which permits cables/hoses to be loaded and removed into/from the chain in a relatively easy manner.

According to one aspect of the present invention there is provided a chain link for a haulage chain capable of hauling cables and hoses, the chain link including a housing body having a pair of opposed side walls extending between opposed top and bottom walls, a pair of chain link transmission members, a first of the chain link transmission members being connected to a first of the opposed side walls and a second of the chain link transmission members being connected to a second of the opposed side walls, the first and second chain link transmission members each being adapted for pivotal connection to respective first and second chain link transmission members of adjacent chain links to define a chain, the top wall and an upper portion of each of the opposed side walls defining a first housing shell and the bottom wall and a lower portion of each of the opposed side walls defining a second housing shell, the first and second housing shells being separable from one another and retention means for retaining the first and second housing shells together to define said housing, the retention means being operable to permit separation of the first and second housing shells for loading/removal of cables and hoses into/out of the chain link.

Various aspects of the present invention are hereinafter described with reference to the accompanying drawings, in which.

Figure 1:
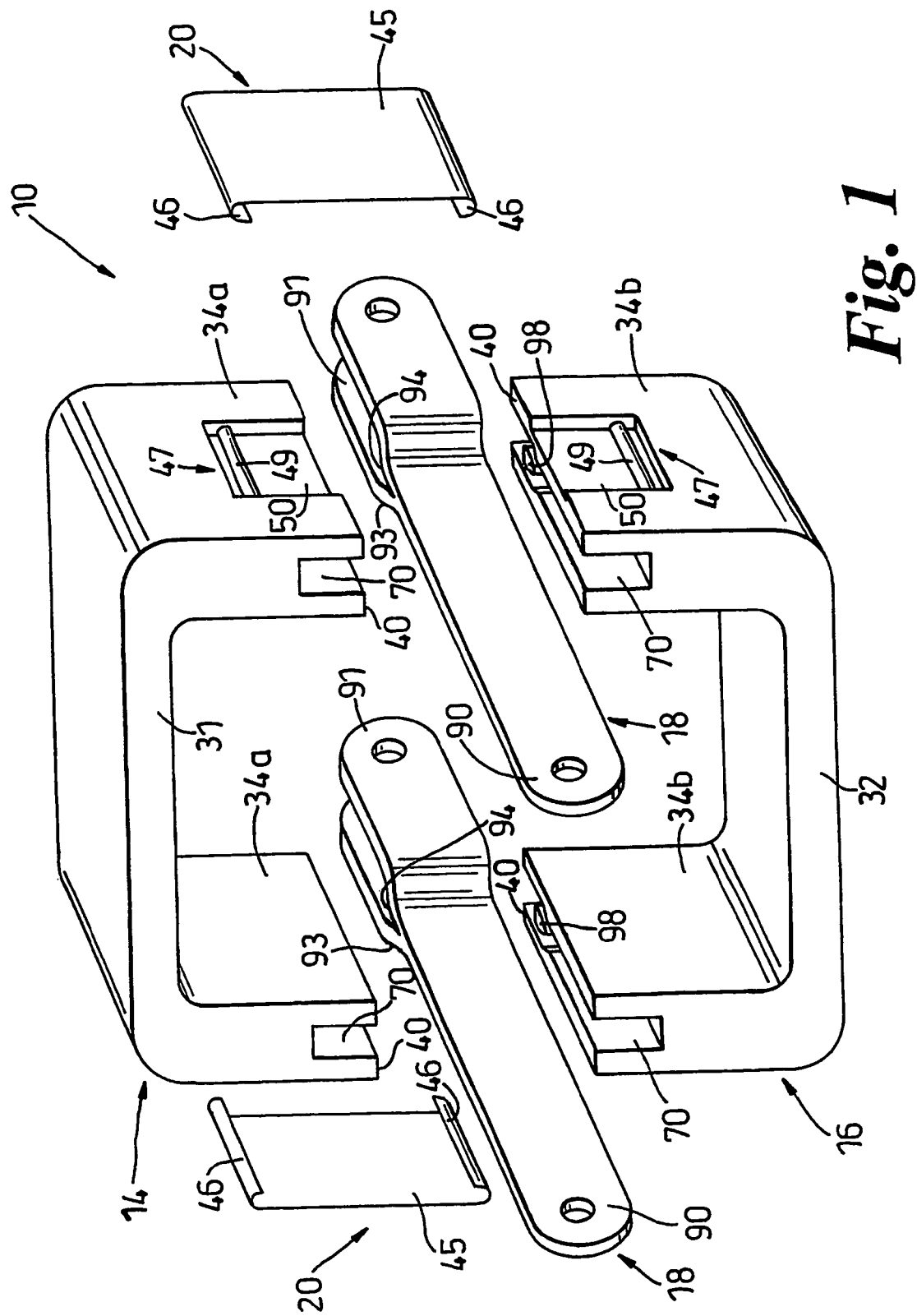
FIG. 1 is an exploded perspective view of an embodiment according to the present invention.

A chain link 10 according to an embodiment of the present invention includes upper and lower housing shells 14, 16 respectively, a pair of chain link transmission members 18 and a pair of retention means 20 for retaining the upper and lower housing shells 14, 16 together in order to define a cable and hose housing 30.

Figure 4:
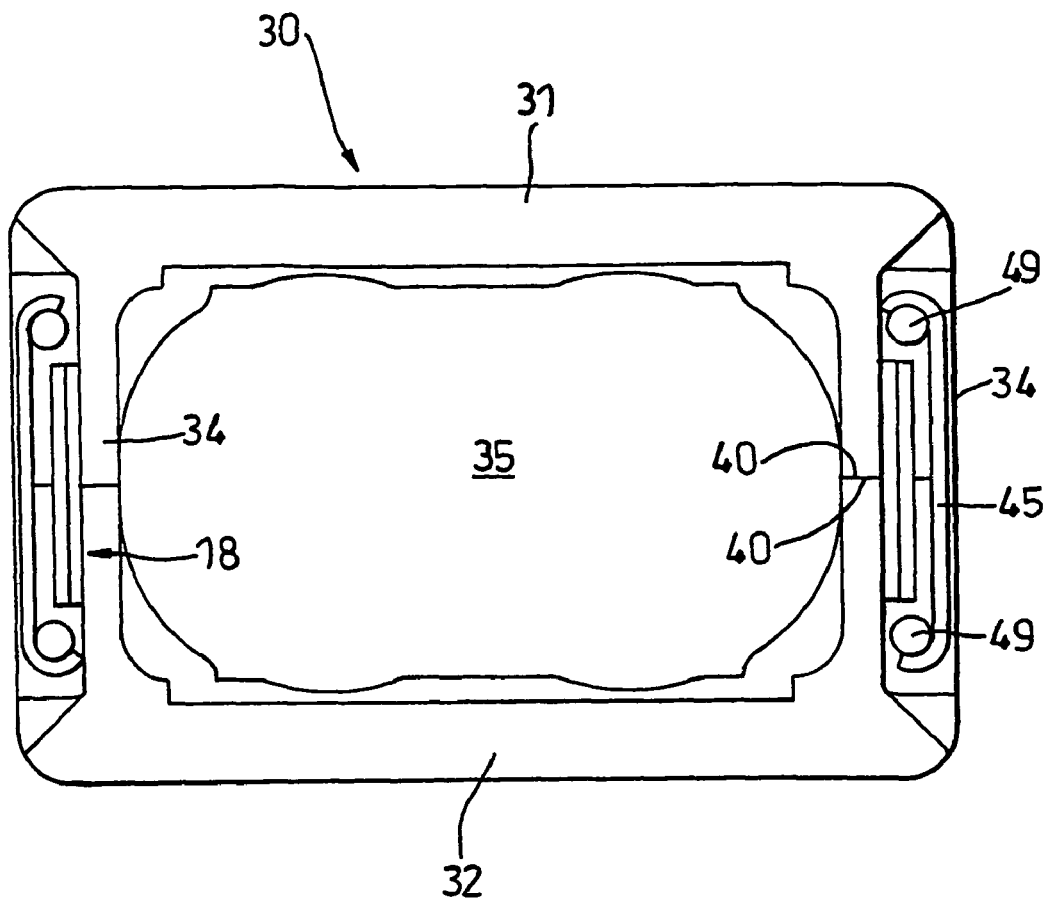
FIG. 4 is a sectional view taken along line IV-IV in FIG. 3.

When assembled, the housing 30 has a top wall 31 opposed to a bottom wall 32 and a pair of opposed side walls 34. As seen more clearly in FIG. 4, the walls 31, 32 and 34 combine to completely surround a cable and hose accommodating chamber 35. The chamber 35 is open ended so that cables and hoses can extend longitudinally along a chain made up of links 10.

The top wall 31 and upper wall portions 34a of side walls 34 define the upper shell 14 and the bottom wall 32 and lower wall portions 34b of side walls 34 define the lower shell 16.

Preferably each shell 14, 16 is moulded from a suitable plastics material such as a polyamide, for example NYLON 6 (RTM).

Preferably each shell 14, 16 is identical so that a single moulding may be used to form either the upper and lower shell 14, 16.

The terminal end faces 40 of the side wall portions 34a, 34b are arranged to be seated in face to face contact when defining the housing 30. The retention means 20 act to maintain the face to face contact between opposed end faces 40.

Figure 2:
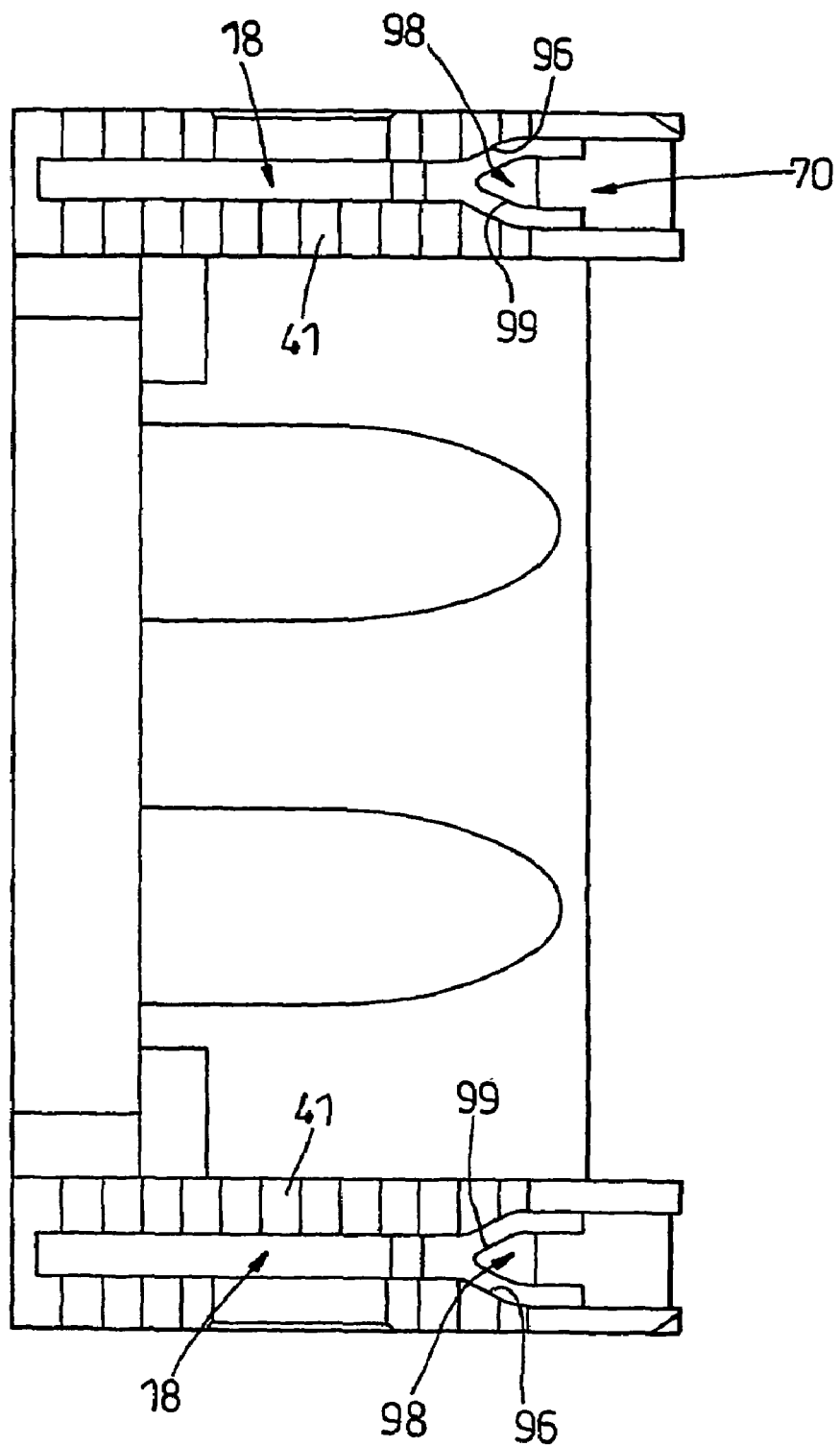
FIG. 2 is a plan view of the lower housing shell shown in FIG. 1.
Figure 3:
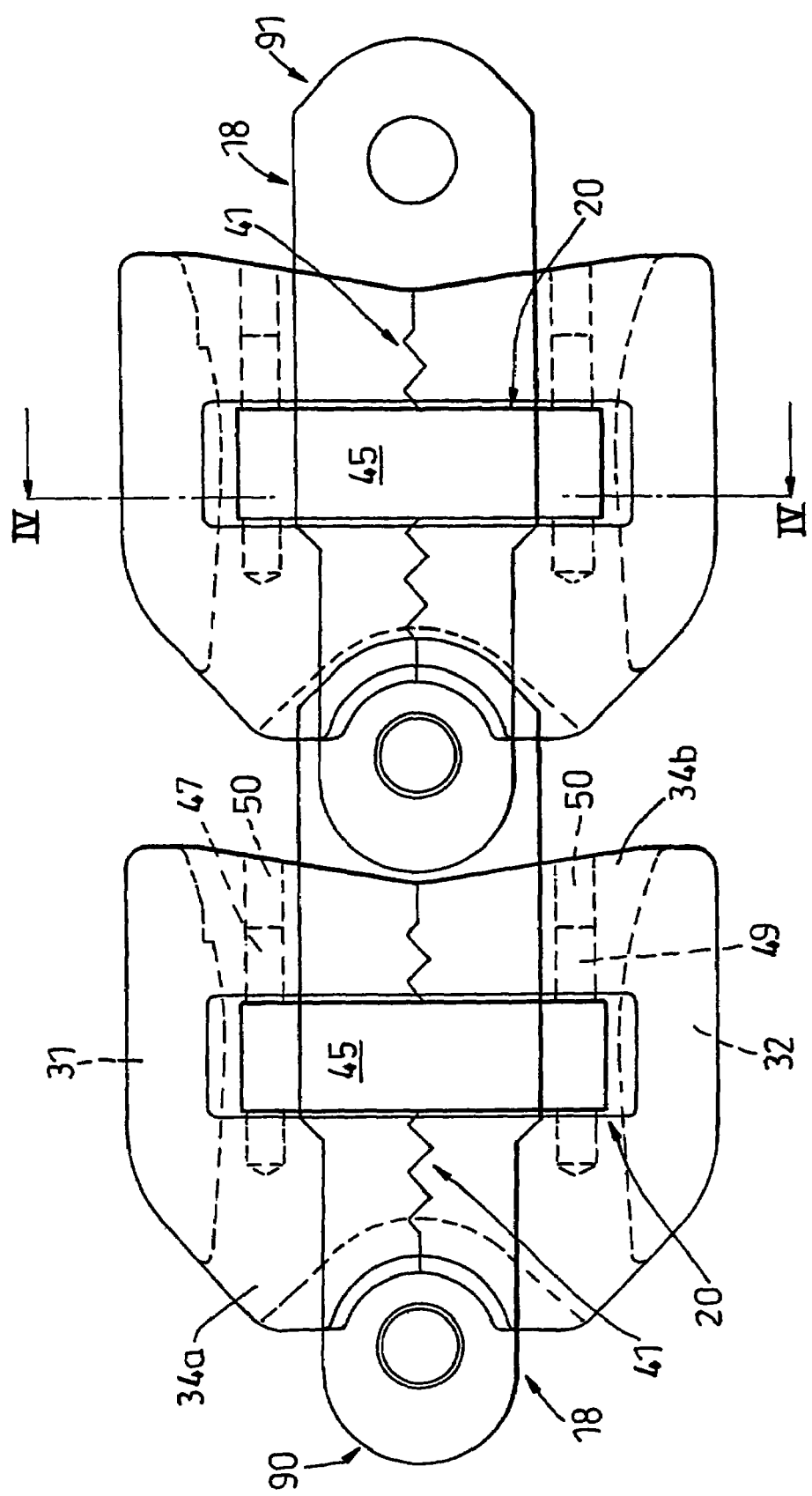
FIG. 3 is a side view showing a pair of chain links pivotally attached to one another.

Preferably, opposed end faces 40 are shaped to co-operate with one another to prevent relative sliding movement therebetween in the longitudinal direction of the chain link when held together by the retention means 20. Accordingly, the end faces 40 are preferably defined by a series of undulations 41 (FIGS. 2, 3).

Each retention means 20 is preferably defined by an elongate clip 45 having hook formations 46 at each end which latchingly engage with a latch formation 47 formed on each side wall portion 34a, 34b. Preferably each latch formation 47 is defined by a rod 49, preferably formed of metal, which is accommodated in a bore 50 formed to extend in the longitudinal direction of the chain link 10.

Preferably the clip 45 is formed from a strip of suitable material such as a metal and the hook formations 46 are formed by bending end portions of the strip. The metal may be spring steel or mild steel.

The distance between the opposed hook formations 46 on the clip 45 is slightly less than the distance between the opposed latch formations 47 engaged thereby such that when the clip 45 is seated on the latch formations 47 the body of the clip 47 is placed under tension and so resiliently urges the upper and lower shells 14, 16 together.

Figure 5:
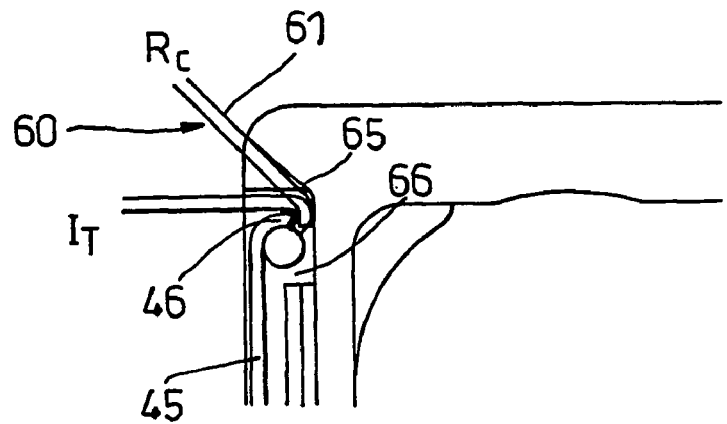
FIG. 5 is a part sectional view similar to FIG. 4 showing use of a tool for separating the housing shells.

In order to separate the shells 14, 16 to permit loading/removal of cables and hoses into/out of the housing 30, it is necessary to remove both clips 45. As illustrated in FIG. 5, this is conveniently done by inserting a tool 60 having an elongate shaft 61 which is curved at its terminal end. As seen in FIG. 5, the tool 60 is inserted at position $I_T$ and rotated in a clockwise direction to position $R_C$ whereat the curved end of shaft 61 engages the terminal end of the hook formation 46 and shaft 61 abuts inclined face 65 of recess 66. Continued rotation causes the shaft 61 to act as a lever (with the upper edge of recess 66 acting as a fulcrum) in order to prise the hook formation 46 out of engagement with the latch formation 47.

Each side wall portion 34a, 34b includes an open topped channel 70 which extends in the longitudinal direction of the chain link 10.

The channels 70 of the upper and lower side wall portions 34a, 34b which define a given side wall collectively define a pocket in which a chain link transmission member 18 is retained.

Preferably each member 18 is formed from a strip of suitable tensile material such as metal to define an elongate body having a first pivotal connection formation 90 at one end and a second pivotal connection 91 as its opposite end.

Preferably pivotal connection 90 defines a male connection and pivotal connection 91 is bifurcated to define a female connection.

The bifurcated shape of the female connection conveniently defines a first axially facing shoulder 93 and a second axially facing shoulder 94 which faces in the opposite axial direction to that of shoulder 93.

Each channel 70 is preferably formed with a shoulder 96 which opposes shoulder 93 and is preferably provided with a projection 98 which has a side face defining a shoulder 99 which opposes shoulder 94. Accordingly the transmission member 18 when located within a pocket defined by opposed channels 70 is restrained from moving axially in both directions relative to the side wall 34 in which it is housed.

Preferably each transmission member 18 is of identical construction such that a given transmission member 18 may be located within either one of the side walls 34.

Adjacent chain links 10 are secured together by pivot pins (not shown) passing through aligned male and female pivotal connections of neighbouring transmission members 18.

For a given chain link 10, the transmission members 18 are accommodated in opposed open topped channels 70. It will be appreciated therefore that upon removal of the retention means 20 of each chain link 10, the upper and lower shells 14, 16 may be separated from each other and also from the transmission members 18 in lateral direction relative to the longitudinal direction of the chain. This provides full access to the cables and hoses and does not require disconnection of the pivotally connected transmission members 18.

The invention claimed is:

1. A chain link for a haulage chain capable of hauling cables and hoses, the chain link including a housing body having opposed side walls extending between opposed top and bottom walls, a pair of chain link transmission members, a first of the chain link transmission members being connected to a first of the opposed side walls and a second of the chain link transmission members being connected to a second of the opposed side walls, the first and second chain link transmission members each being adapted for pivotal connection to respective first and second chain link transmission members of adjacent chain links to define a chain, the top wall and an upper portion of each of the opposed side walls defining a first housing shell and the bottom wall and a lower portion of each of the opposed side walls defining a second housing shell, the first and second housing shells being separable from one another, and retention means for retaining the first and second housing shells together to define said housing, the retention means being operable to permit separation of the housing shells to permit loading/removal of cables and hoses into/out of the chain link, and wherein each side wall includes a pocket in which a respective chain link transmission member is retained, access to said pocket being achieved by separation of said housing shells to permit insertion of said respective chain link transmission member.

2. A chain for a haulage chain capable of hauling cables and hoses, the chain link including a housing body having opposed side walls extending between opposed top and bottom walls, a pair of chain link transmission members, a first of the chain link transmission members being connected to a first of the opposed side walls and a second of the chain link transmission members being connected to a second of the opposed side walls, the first and second chain link transmission members each being adapted for pivotal connection to respective first and second chain link transmission members of adjacent chain links to define a chain, the top wall and an upper portion of each of the opposed side walls defining a first housing shell and the bottom wall and a lower portion of each of the opposed side walls defining a second housing shell, the first and second housing shells being separable from one another, and retention means for retaining the first and second housing shells together to define said housing, the retention means being operable to permit separation of the housing shells to permit loading/removal of cables and hoses into/out of the chain link, and wherein the upper and lower portions of respective side walls have opposed end faces held in abutment by said retention means, the opposed end faces being configured to prevent relative sliding movement therebetween in the longitudinal direction of the chain link.

3. A chain link according to claim 2 wherein the first and second housing shells are identical.

4. A chain link according to claim 1 wherein the first and second housing shells are identical.

* * * * *